United States Patent

[11] 3,600,745

[72] Inventors Hans Heinrich Wilhelm Hench
Aschaffstrasse 75, 8750, Aschaffenburg;
Wilhelm August Seegers, Obernburg Main;
Leo Karl Markus Muller, Mespelbrunn, all
of, Germany
[21] Appl. No. 57,074
[22] Filed July 22, 1970
Division of Ser. No. 596,213, Nov. 22, 1962,
Pat. No. 3,436,792
[45] Patented Aug. 24, 1971
[73] Assignee said Hench, by said Seegers and said Muller
[32] Priority Aug. 6, 1969
[33] Germany
[31] P 19 39 871.1
Continuation-in-part of application Ser. No.
844,685, Apr. 7, 1969

[54] DEVICE FOR THE GRANULATION OF
SYNTHETIC PLASTICS
37 Claims, 13 Drawing Figs.
[52] U.S. Cl. ................................................. 18/1 B,
18/12 A, 18/12 TS
[51] Int. Cl. ................................................... B29f 3/00
[50] Field of Search ....................................... 18/1 B, 12
A, 12 TS, 4 S

[56] References Cited
UNITED STATES PATENTS
3,029,466  4/1962  Guill ........................... 18/1 B
3,432,579  3/1969  Zavasnik ..................... 18/1 B Primary Examiner—H. A. Kilby, Jr.
Attorney—Otto John Munz ABSTRACT: A device for the processing of synthetic plastics from a melt to solid granules of uniform size, the device including in succession an autoclave or extruder holding the melt, a casting unit and distributor with a plurality of discharge ducts and shutoff valves in the ducts, a partially mobile discharge unit with aligned injectors into which the liquid melt is discharged. In the injectors and subsequent guide hoses the strands of plastic are cooled for partial solidification by a first flow of water, then stretched and further solidified by a second, pressured flow of water. The guide hoses lead the strands and the surrounding water to a cutting unit where rapidly moving cutters chop the plastic strands into granules. Quick-connect links on the guide hoses, auxiliary valve control means and access provisions for adjustment and inspection provide operational reliability.

Patented Aug. 24, 1971

INVENTOR:
HANS HEINRICH WILHELM HENCH,
WILHELM SEEGERS, LEO MÜLLER
BY:

ATTORNEY

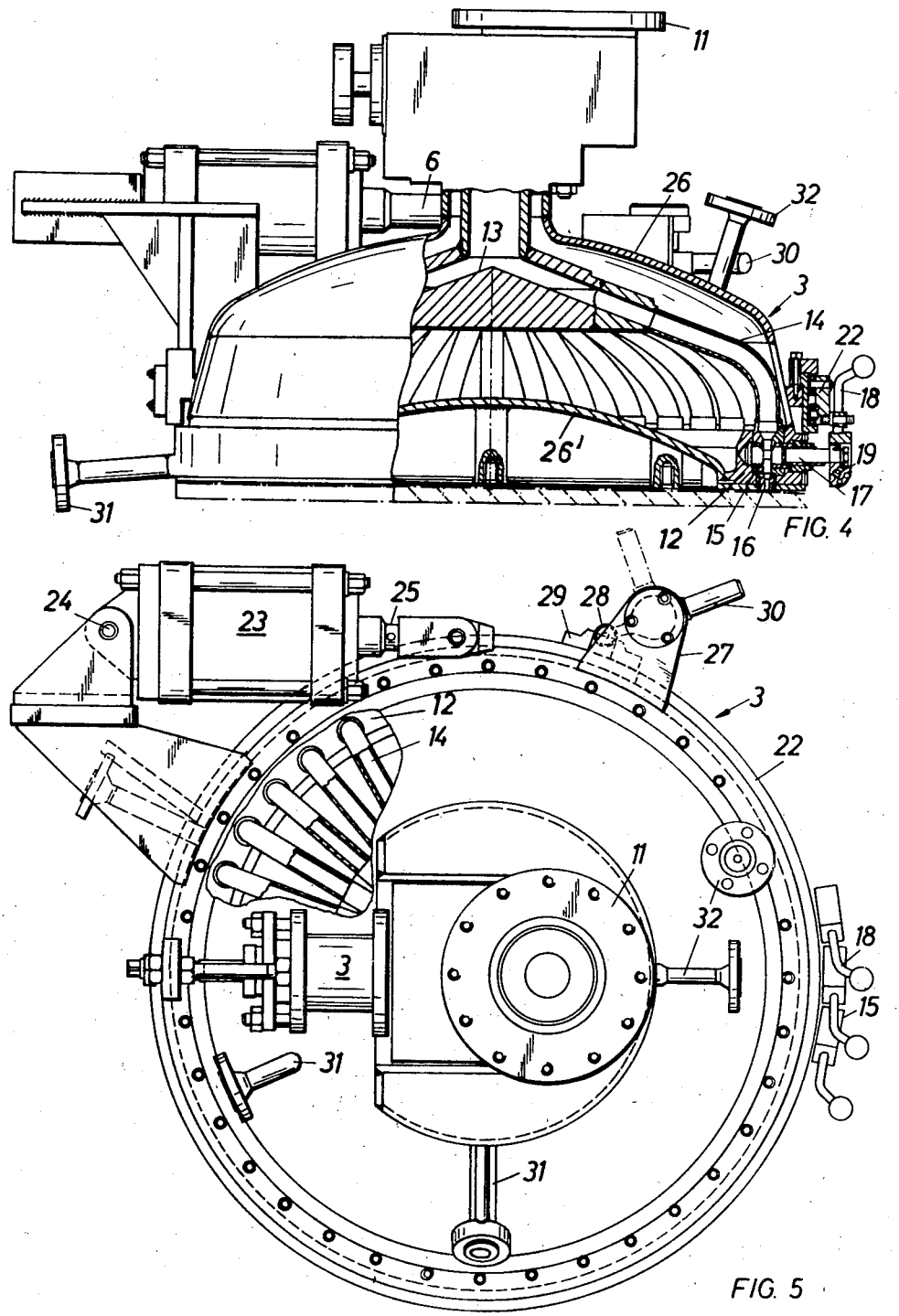

INVENTOR:
HANS HEINRICH WILHELM HENCH,
WILHELM SEEGERS, LEO MÜLLER

BY:
ATTORNEY.

INVENTOR:
HANS HEINRICH WILHELM HENCH,
WILHELM SEEGERS, LEO MÜLLER
BY:
ATTORNEY

Patented Aug. 24, 1971

INVENTOR:
HANS HEINRICH WILHELM HENCH,
WILHELM SEEGERS, LEO MÜLLER

BY:

ATTORNEY

INVENTOR:
HANS HEINRICH WILHELM HENCH,
WILHELM SEEGERS, LEO MÜLLER
BY:

ATTORNEY

INVENTOR:
HANS HEINRICH WILHELM HENCH,
WILHELM SEEGERS, LEO MÜLLER
BY:
ATTORNEY

INVENTOR:
HANS HEINRICH WILHELM HENCH,
WILHELM SEEGERS, LEO MÜLLER
BY:

ATTORNEY

DEVICE FOR THE GRANULATION OF SYNTHETIC PLASTICS

CROSS-REFERENCES TO RELATED APPLICATIONS

The present application is a continuation-in-part of applicant's copending U.S. Pat. application Ser. No. 844,685, filed Apr 7, 1969, as a divisional application of application Ser. No. 596,213, filed Nov. 22, 1962, now U.S. Pat. No. 3,436,792 with a claim to priority of German application H 57.776, filed Nov. 26, 1965.

BACKGROUND OF THE INVENTION

1. Field of the Invention

The present invention relates to devices for the discharge of melts, especially melts of organic compounds such as synthetic plastics, and in particular, devices which are used for the production of granules, strands, or fibers, employing liquid and/or gaseous fluids that serve both as cooling agents and to accelerate the discharge of the melt through their suction effect, the velocity and/or the flow rate of the liquid or gaseous fluids being adjustable.

2. Description of the Prior Art

In such devices the discharging melt is first guided by a stream of cooling fluid which moves substantially parallel to the direction of discharge of the melt. The stream of cooling fluid is maintained by means of a suction fluid stream which may initially also serve for cooling purposes. The discharging melt is solidified through contact with the cooling fluid and removed together with the cooling and suction fluids.

Various devices designed for the granulation of synthetic plastic materials have been proposed in the past, most of them involving very complex machinery, but without adequately solving the problems involved in achieving the desired uniformity in granule size, and without avoiding the creation of a substantial amount of dust and grime.

SUMMARY OF THE INVENTION

The objective underlying the present invention is a device for the granulation of synthetic plastics producing granules of highly uniform size and of high purity, i.e., granules which are free of the earlier mentioned defects. Further requirements are that the device can be manufactured at the lowest possible cost, and that no special skills are required for its operation. The present invention suggests such a device As an essential part of the invention, the device embodying it includes a casting unit which receives the liquid melt from the autoclave or from the extruder. From the casting unit the melt passes to a discharge unit which has a plurality of injectors arranged around its center axis. Strands or fibers of the liquid melt are discharged through these injectors into cooling ducts (hoses or pipes), where they solidify under the influence of the cooling fluid and through which they are guided to a cutting unit.

A first advantage of the device of the present invention is that its various parts form an integral overall assembly; the various working units are directly joined to one another, so as to avoid any possible damming-up or blockage of the melt flow. The device can be operated without any reduction in its operative efficiency in either a vertical or a horizontal arrangement. The type of arrangement to be chosen depends in the main on the space available. Furthermore, the use of either an autoclave or an extruder does not affect the operation of the device.

The distributor and casting dam form a single unit, the casting unit, which is heated and thermally insulated. It includes a nitrogen supply line, as the case may require. The discharge ducts, arranged in axial direction in the casting unit, are provided with shutoff valves which can be controlled either separately or in unison.

A preferred embodiment includes a main valve upstream of the casting unit through which the total flow of material to the casting unit can be controlled, while the separate shutoff valves in the discharge ducts allow stopping of particular strands, wherever this is indicated due to malfunction or other reasons.

The discharge duct shutoff valves can also be operated in unison by means of a valve control ring arranged on the periphery of the casting unit and having preferably a radially extending pair of rollers or the like for each valve, to engage its pivoting control lever. Each valve has an additional control knob on the lever. This arrangement with the rollers on the valve control ring and the pivoting control levers allows both individual operation and simultaneous operation of the shutoff valves, and thus permits the operator to control the device under all operative conditions.

In another preferred embodiment of the invention, the casting unit is designed to form the bottom of the autoclave. This type of casting unit is flange-mounted to the autoclave, thereby facilitating the cleaning of the autoclave and of the casting unit. In this connection, it was found that a particular spacing of the discharge ducts gives especially favorable results, the axes of the ducts being arranged on one or several concentric circles around the axis of the autoclave:

If R stands for the inner radius of the autoclave, and r stands for the radius of a circle on which the centers of the discharge duct cross sections (their entry cross sections) are located, then R and r should be chosen so as to satisfy the following condition: the annular area enclosed between the two circles formed by R and r is to be identical with the area within the circle of radius r, the deviations from this equality not to exceed 10 percent. Expressed mathematically, this condition means that $$\frac{R^2 - r^2}{r^2} = 1(\pm 10\%),$$

or:

$$r_{max} = 0.725R, r_{min} = 0.690 R.$$

In the case where the discharge ducts are located on several concentric circles, the radius r would logically be the geometric mean value of the various center circles.

The longitudinal axes of the discharge ducts may be located either on the periphery of a cylinder or on the periphery of a cone widening in the downstream direction. In the latter case, the radius r applies to the plane in which the discharge ducts open into the autoclave.

It was further found to be advantageous that the inner portion of the casting unit, i.e. that portion which is enclosed within the one or several circles on which the discharge ducts are located, be raised to the form of a cone around the axis of the autoclave so as to point into the autoclave, the angle of opening $\alpha$ of the cone being determined by the condition:

$$\alpha = 60° \text{ to } 120°.$$

It is likewise suggested that the inner wall of the autoclave have a tapered transition portion in its bottom part, the taper line rising from the center circle of the discharge ducts at an angle $\beta$ to the (horizontal) plane in which the ducts originate, the angle $\beta$ being determined by the condition:

$$\beta = 30° \text{ to } 60°.$$

With respect to the shape of the discharge ducts, it was found to be advantageous that they be as short as possible, their length being determined primarily by the thickness of the flange as required to withstand the stresses. These ducts may be cylindrical in shape, or they may be tapered so as to open up toward the autoclave. The optimal value for the diameter d of these ducts was found to be:

$$d = 20 \text{ mm.} \begin{array}{l} +10 \text{ mm.} \\ -5 \text{ mm.} \end{array}$$

In the case of tapered ducts, the diameter d would refer to the narrowest portion of the duct.

In order to facilitate the heating of the casting unit in this particular design, it was found that horizontal heating pockets arranged inside the flange, for example, by milling them into the flange, were particularly advantageous.

The invention suggests a discharge unit having a two-section housing which encloses two separate water chambers, the housing being supported on top of a movable dolley by means of vertical guide columns and a lifting cylinder attached to the dolley, so that the discharge unit can be moved and adjusted to approach the discharge unit from below to the casting unit in proper alignment and at the desired small clearance, so as to bring into exact alignment the injectors of the discharge unit and the corresponding discharge ducts of the casting unit, thus assuring the formation of acceptable strands. This arrangement of the discharge unit on top of a dolley has the further advantage of allowing the switching of the unit between different production stations. This procedure does not require any exertions on the part of the operator.

The upper one of the two water chambers has the form of a flat bowl with the water supply connected from below. The injector heads penetrate from below into this bowl to a distance above the bottom of the bowl, the elevation of their upper orifices determining the water level in the chamber. Water is continuously pumped from below into the chamber and it flows off through the injector heads.

Before the water enters the bowl is is preferably caused to flow through a large screen at the bottom of the bowl, the screen not only serving as a filter but also serving to reduce any water turbulence. Major turbulence in the water entering the bowl could cause the strands of solidifying material to deform, thereby producing irregularities in the granules.

The second water chamber is a flat, annular chamber connected to a pipe supplying pressurized water. The injector assemblies reach from below through this annular chamber, allowing the pressurized water to enter into the injectors after traversing an annular screen. Here again, the screen serves to filter the water and to steady its flow.

Each injector assembly consists of three major parts, sealingly joined to one another with the help of O-rings: a standpipe; a casing; and a funnel-shaped injector head with radial guide fins. The latter is attached to the casing by means of a bayonet-type quick-release connection to facilitate removal of the injector heads for cleaning and checking of the injector gaps. All parts are easy to assemble. Each injector assembly is connected at its lower end to a separate hose or pipe, the hoses or pipes leading to a cutting unit.

The invention suggests, as a simplification of the connections for the hoses or pipes, that special connecting sockets are provided at the lower ends of the standpipes into which the connecting sleeves of the hoses can be inserted and quickly fastened in a known way. Similar connecting sockets and sleeves are provided at the connecting points between the hoses or pipes and the cutting unit, thus simplifying the assembly and reducing the cost of the device.

The cutting unit of the device suggested by the invention consists of an annular housing, one side thereof being formed by a ring collar which carries the connecting sockets for the hoses. A cover arranged centrally within this ring allows access to the cutters on the cutter rim (in order, for example, to quickly check and adjust the clearance between the shear bushings and the individual cutters on the rim). On the lower (inner) side of the collar are mounted shear bushings in alignment with the hose connections, these bushings being of tungsten-carbide or some other suitable wear-resistant material. The faces of all the shear bushings are ground simultaneously to assure the same cutting clearance on all of them. The housing has one radial outlet and one tangential outlet, and its inside is surface treated, for example, chemically nickel plated. The two outlets allow easy removal of the granules and of the cooling water; the surface treatment of the housing prevents excessive wear of the housing walls which, as was found in practical applications, can be considerable without such protective treatment.

The individual cutters of the cutting unit, as well as the cutter rim carrying the cutters, are interchangeably attached to the cutter unit rotor in a known manner, thus permitting quick replacement of the cutter rim and cutters.

A further feature of the invention allows for an axial fine adjustment of the drive shaft on which the rotor is mounted. A ring and lock unit with fine thread cooperating with the shaft bearing make possible accurate adjustment of the clearance between the shear bushings and the cutters. For adjustment purposes, the ring carries on its periphery a row of teeth for engagement by a spring-loaded detent pin which can be released by means of a knob.

BRIEF DESCRIPTION OF THE DRAWINGS

In the accompanying drawing is illustrated, by way of an example, an embodiment of the invention, represented in the various figures as follows:

FIG. 4 shows, in front elevation and at an enlarged scale, a casting unit for the granulation device of the invention, part of the unit being shown in cross section;

FIG. 5 shown a plan view of the casting unit of FIG. 4, a portion of the covers being cut away;

DESCRIPTION OF THE PREFERRED EMBODIMENTS

Figure 1:
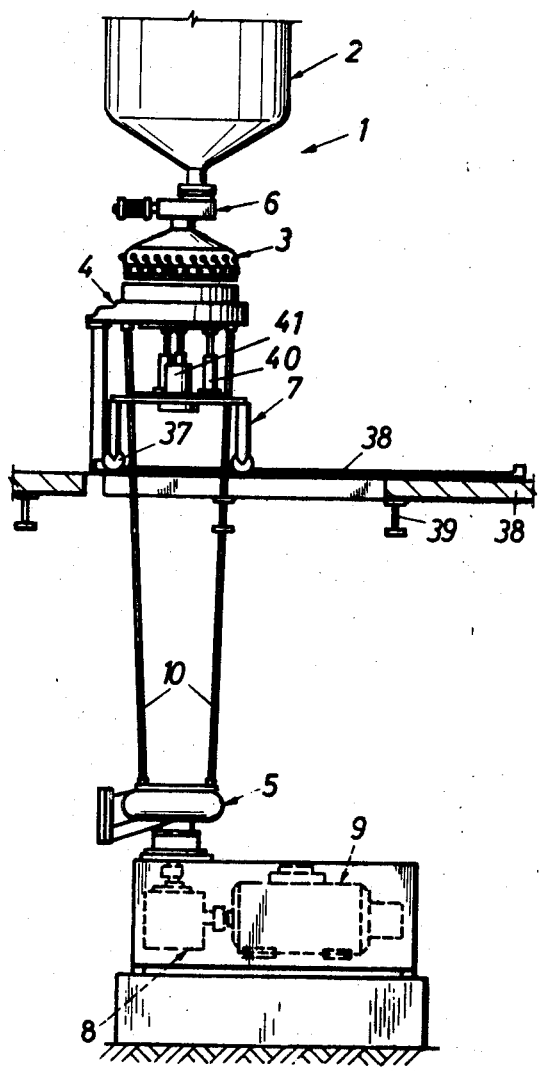
FIG. 1 shows, in front elevation, a granulation device representing an embodiment of the invention.
Figure 2:
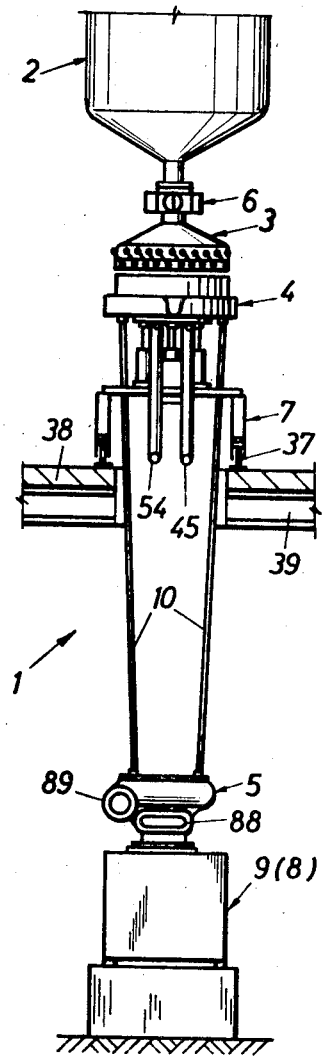
FIG. 2 shows the device of FIG. 1 in side elevation.
Figure 3:
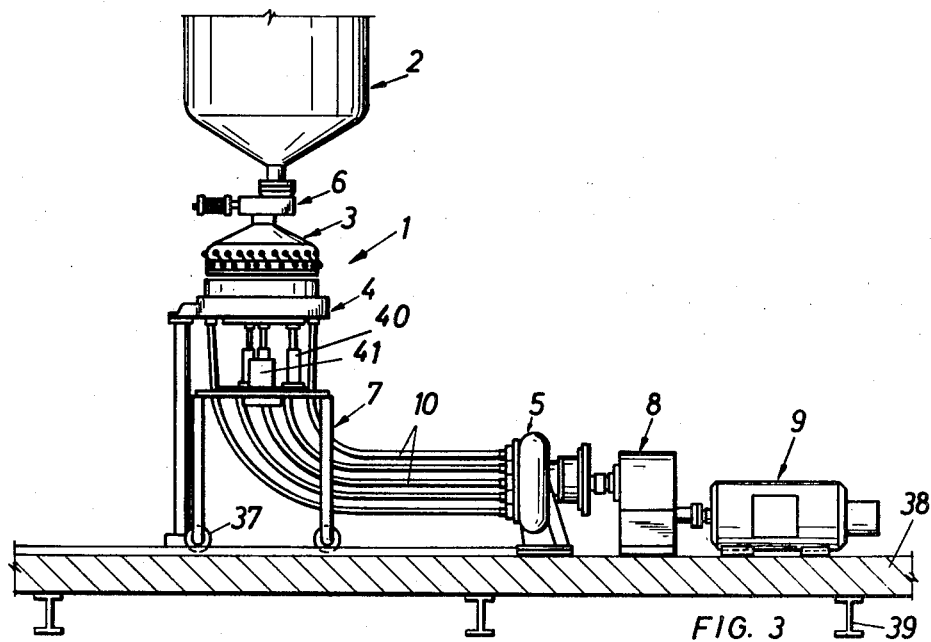
FIG. 3 shows, in front elevation, a device similar to that of FIG. 1 representing a modified embodiment of the invention.

As can be seen from FIGS. 1, 2 and 3, the granulation device 1 comprises an autoclave or extruder 2 and connected to it a casting unit and distributor 3, a discharge unit 4, and cutting unit 5. In the embodiments shown in the FIGS. 1–5, a main valve 6 is arranged between the autoclave or extruder 2 and connected to it a casting unit 3. The discharge unit 4 is supported by a dolley 7 and includes a plurality of hoses or pipes 10 extending between the discharge unit 4 and the cutting unit 5. The cutting unit is connected to a drive gear 8, driven by a motor 9. A comparison between FIGS. 1 and 3 shows that the cutting unit 5 and its drive (8, 9) can be arranged either vertically or horizontally.

According to FIG. 4, the main valve 6 carries a connecting flange 11 for its connection to the autoclave or extruder 2, the valve itself being mounted on top of the casting unit 3. This casting unit 3 includes a covered distributor cone 13 to which are connected numerous distribution pipes 14. Each of these pipes 14 leads downward to the distribution valve 15 by which the passage to the nozzle 16 below the valve 15 can be opened and closed. The connecting flange 11, the main valve 6, and the distribution pipes 14 are clearly visible in FIG. 5. Each of the distribution valves 15 has a radially extending valve shaft 17 with a valve control lever 18, the latter being also visible in FIG. 9. The distributor cone 13, the cone cover, and the distribution pipes 14 are surrounded by a heating medium held within the chamber formed by the bottom cover 26' and the top cover 26.

Figure 9:
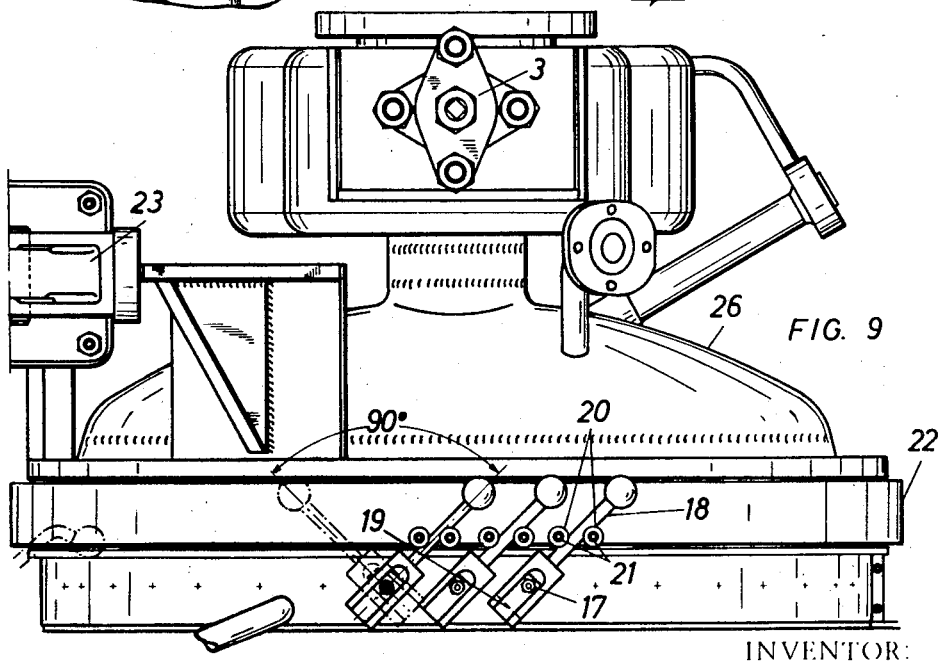
FIG. 9 shown the casting unit of FIG. 4 in side elevation.

As can also be seen from the FIGS. 4, 5 and 9, the valve control levers 18 are connected to their respective shafts 17 by a pivot head 19 allowing the control levers to be pivoted out of their normal position.

In FIG. 9 is further illustrated how the valve control levers 18 cooperate with rollers 20 which are mounted on pins 21 extending from a rotatable valve control ring 22. This rotatable ring 22 is linked to a pneumatic cylinder 23 (FIG. 5) which has a stationary support 24 and whose piston rod 25 controls the rotational position of the valve control ring 22.

Figure 6:
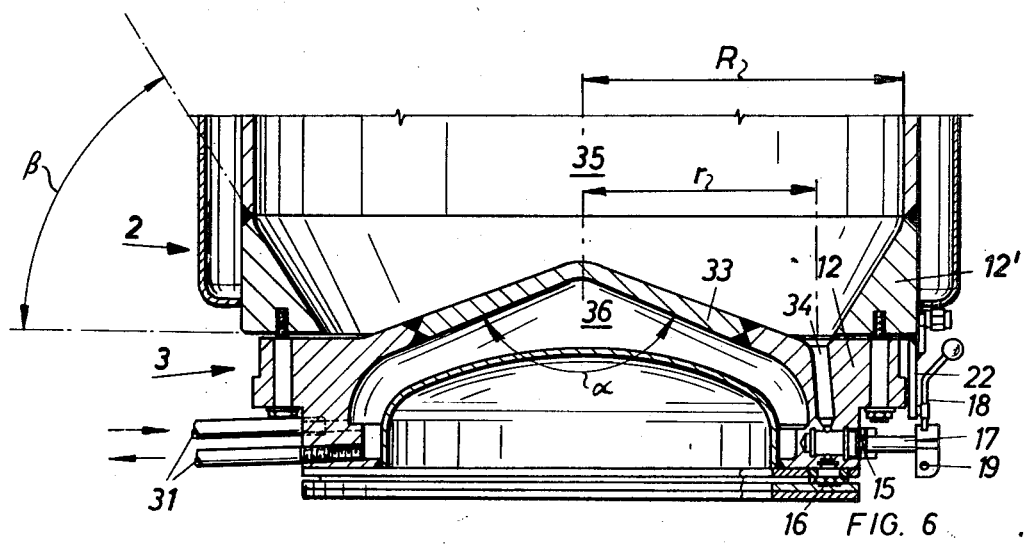
FIG. 6 shown, in an elevational cross section, a modified version of the casting unit.

To the casting unit 3 is further attached a support 27 which pivotably supports an auxiliary lever 28 cooperating with the valve control ring 22 via a bracket 29. The auxiliary lever 28 has at its opposite end a short extension 30 over which can be inserted an extension tube in order to rotate the ring 22 by pivoting the lever extension 30. This manual control possibility is provided for the case of emergency, when the pneumatic cylinder 23—or a hydraulic cylinder in its place—fails to operate. The connectors 31 and 32 (FIGS. 4 and 5) are intended for the supply of nitrogen and/or heat. As can be clearly seen in FIG. 9, rotation of the valve control ring 22 causes all the valve control levers 18 to move from one end position (shown in full lines) to the opposite end position (shown in dotted lines). When it is necessary to operate a distribution valve individually, its control lever 18 is simply pivoted away from the rollers 20 and then individually rotated by one-quarter turn. FIG. 6 shows a modified embodiment of the casting unit of the invention, the body of the casting unit 3 serving also as the bottom of an autoclave 2. For this purpose, a flange 12' is welded to the lower end of the autoclave 2; and the casting unit 3, carrying a matching flange 12, is attached thereto by means of bolts.

The center of the casting unit 3 is again formed by a distributor cone 33 whose periphery is welded to the flange 12. Across this flange 12 pass a plurality of discharge ducts 34. The axes of these discharge ducts 34 are so arranged relative to the main axis of the autoclave that they geometrically coincide with the generatrix of either a cylinder or an upwardly narrowing cone around the main axis, the openings of the discharge ducts 34 into the autoclave interior 35 being positioned in a plane perpendicular to the autoclave axis.

At the bottom end of the discharge ducts 34 are nozzles 16, the ducts being closable by means of control valves 15. These valves are operable in the manner described further above. A heating jacket 36 is arranged underneath the distributor cone 33, the heating medium being circulated through the piping 31.

According to the invention, it is preferable that the circle on which the openings for the discharge ducts 34 are located be the dividing line between two equal halves of the inner cross-sectional area of the autoclave. In other words, the ring area enclosed between the inner diameter of the autoclave and the circle of the duct openings should be equal to the circular area enclosed by the latter circle alone. The deviations from this equality should not exceed 10 percent in any direction. The above condition can be stated mathematically as follows:

$$\frac{R^2 - r^2}{r^2} = 1(\pm 10\%)$$

or $$r_{max} = 0.725R$$
$$r_{min} = 0.690R$$

wherein $R$ refers to the inner radius of the autoclave and $r$ to the distance between the autoclave axis and the discharge openings.

Where the openings of the discharge ducts 34 are arranged on several concentric circles, the radius $r$ would logically represent the geometric mean of the various center circle distances from the axis.

With respect to the distributor cone 33, it was found that the angle of opening of the cone should preferably not be less than 60° and not more than 120°. Likewise, the bottom portion between the discharge duct openings and the autoclave wall should be inclined from the horizontal, rising toward the wall at an angle of not less than 30° and not more than 60°.

It was further found that the diameter of the discharge ducts 34 should preferably be about 20 mm., with an upper limit of 30 mm. and a lower limit of 15 mm. In the case of noncylindrical ducts, when, as may be desirable, tapered discharge ducts are used, the ducts should taper toward the valves 15 and the diameter $d$ should be the smallest diameter of the duct.

Figure 7:
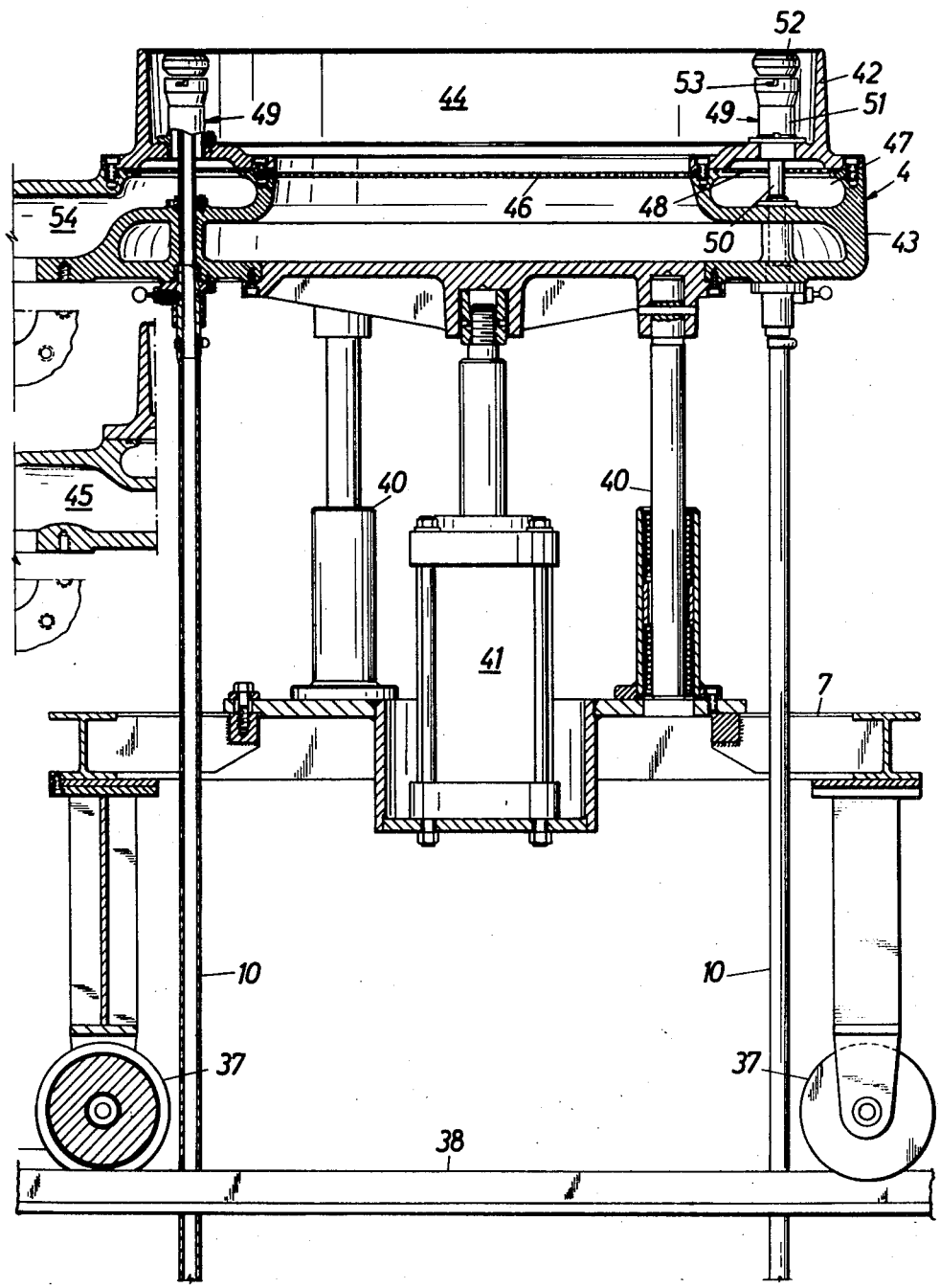
FIG. 7, in an elevational cross section, a discharge unit for the granulation device of the invention, including a dolley support.

As can be seen from the FIGS. 1, 2 and 3, the granulation device of the invention has its discharge unit 4 supported by a movable dolley 7, which, via casters 37, rests on a bridge or platform 38 carried by beams 39. FIG. 7 shows that the discharge unit 4 is not directly mounted on the dolley 7, but is connected thereto by means of vertical guide columns 40 and supported by a lifting cylinder 41 mounted on the dolley, the lifting cylinder being either of the hydraulic or of the pneumatic type. With this arrangement it is possible to conveniently lower and raise the entire discharge unit 4 and to remove it from below the casting unit 3.

The discharge unit 4 shown in FIGS. 7 and 9 consists of an upper housing section 42 and a lower housing section 43. The section 42 has a flat, bowl-shaped outline, serving as a "standing water" chamber, or headwater chamber 44, with the water being supplied through the inlet 45. However, the water coming through the inlet 45 does not directly enter the chamber 44, but must pass through a screen 46. This screen not only serves as a filter for the water, but also reduces its turbulence. The screen 46 can be removed for cleaning, if necessary. The headwater chamber 44 not only occupies the space within the upper housing section 42 but also the major portion of the space within the lower housing section 43 below the screen 46. The housing section 42 and 43 also form between them an annular pressure chamber 47 which holds an annular screen 48. Through the pressure chamber 47 extends a row of injectors 49, these injectors corresponding in number and position with the discharge ducts 34 of the casting unit 3.

Each injector 49 consists essentially of three parts, a standpipe 50, a casing 51, and an injector head 52. The head 52 is connected to the casing 51 by means of a bayonet-type quick-release connection 53 which facilitates removal of the injector head 52 for cleaning purposes and in order to check the injector gaps. The water is supplied to the pressure chamber 47 through the inlet 54.

Figure 8:
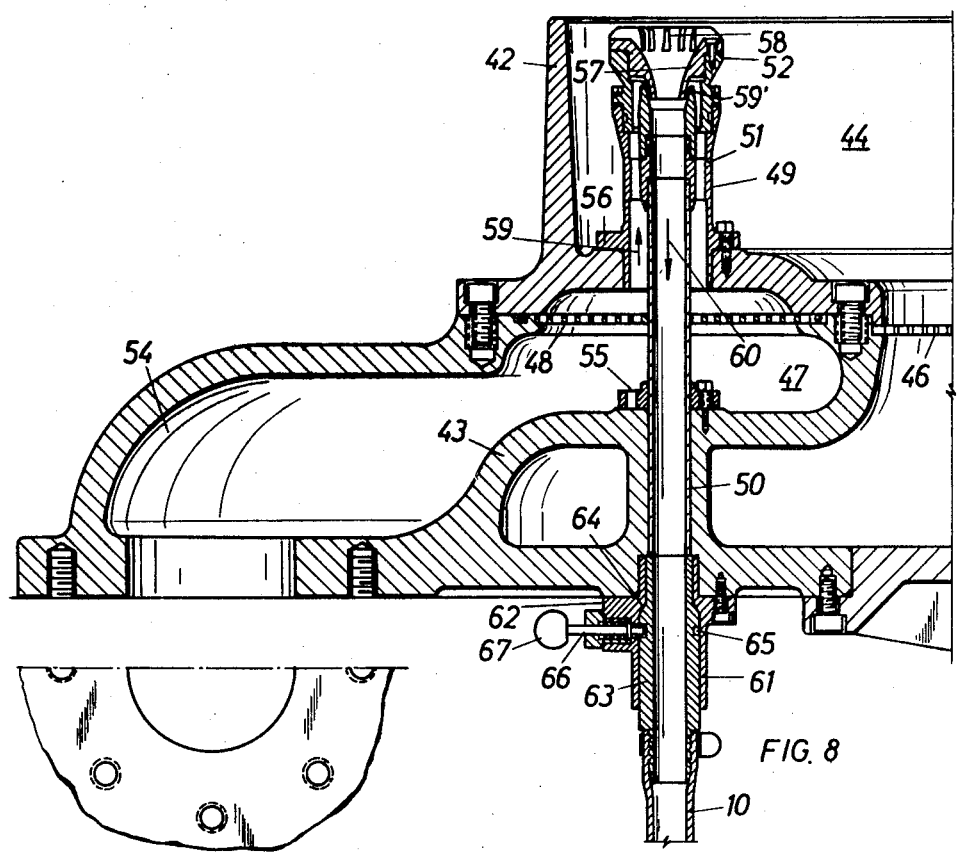
FIG. 8 shows, at an enlarged scale, a portion of the discharge unit of FIG. 7.

Further details of the injectors 49 are shown in FIG. 8. As can be seen therein, the standpipes 50 are fastened to the lower housing section 43 by means of flanges 55. The casings 51 have similar flanges 56 by which they are attached to the upper housing section 42. The injector head 52 has a funnel-shaped mouth 57 and radially oriented guide fins 58 in the mouth portion. It can further be seen that the pressurized water passes through the annular space 59 between the standpipe 50 and the casing 51 to enter into the injector 49 through the injector gap 59' thereby reversing the flow of pressurized water and creating a suction effect around the strand of plastic (not shown in the figure) which passes through the injector 49 in the direction of arrow 60 while solidifying.

The standpipes 50 of the discharge unit communicate at their bottom end with connecting sockets 61 for the attachment of the hoses or pipes 10. The sockets 61 include flanges 62 by which they are attached to the underside of the lower housing section 43. The inside of each connecting socket is shaped to accommodate a connecting sleeve 63 attached to the upper end of the hose 10, the sleeve 63 including a matching tapered seat 64 and, as the case may require, an O-ring to seal the sleeve 63 against the socket 61. The sleeve 63 is retained inside the socket 61 by means of an arresting pin 66 engaging a groove 65 in the sleeve 63. The spring-loaded pin 66 can be retracted by means of a know 67. The upper end of the hose or pipe 10 is firmly attached to the free end of the connecting sleeve 63 in a conventional manner.

Figure 10:
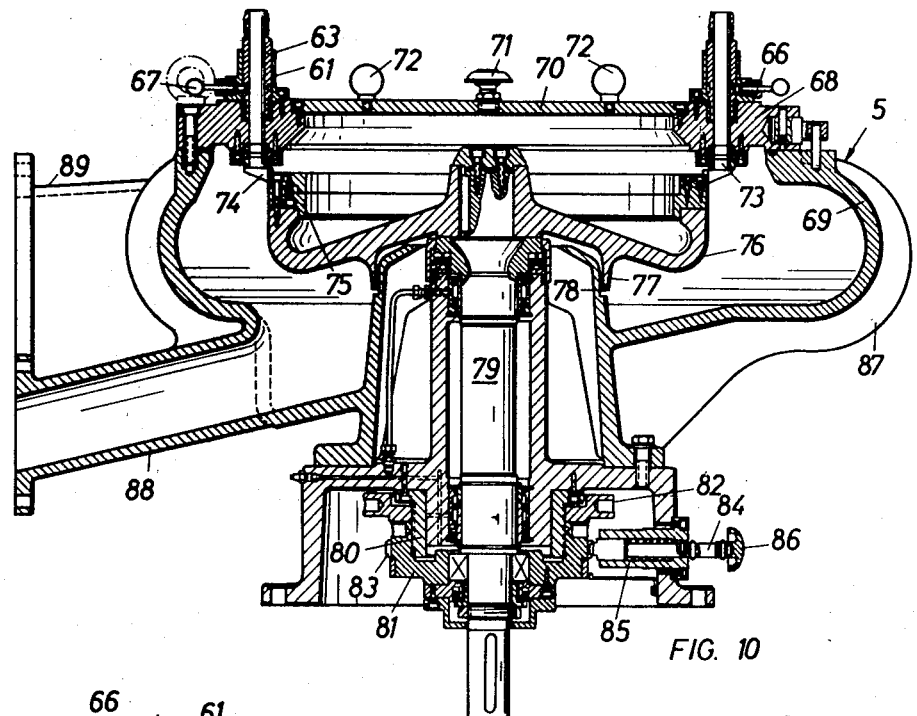
FIG. 10 shows, in an elevational cross section, a cutting unit without drive for the granulation device of the invention.

As can be seen from FIG. 10, the lower extremities of the guide hoses or guide pipes 10 are similarly connected to the cutting unit 5, the connections including again a row of stationary connecting sockets 61 and quick-release connecting sleeves 63 attached to the extremities of the hoses or pipes.

The cutting unit 5 of FIG. 10 comprises a ring collar 68 to which the above-mentioned lower connecting sockets 61 are attached, the collar 68 being attached to the housing 69 in the manner of a flange. The collar 68, together with a lid 70 centrally mounted therein, form a cover for the housing 69. The lid 70 carries a vent button 71 and hand knobs 72. On its inner face, the collar 68 carries a row of shear bushings 73 aligned with the strand passages, the shear bushings 73 being made of a highly wear-resistant material.

In the center of the housing 69 is rotatably arranged a rotor 76, mounted on a vertical shaft 79. The disk-shaped rotor 76 carries on its upwardly facing periphery a cutter rim 75 to which a plurality of cutters 74 are attached interchangeably (see FIG. 12, left half). On its lower side the rotor 76 has a circular lip cooperating with a tapered portion 78 of the housing 69 to form a centrifugal seal against the inside of the housing. To the free end of the shaft 79 is connected the earlier mentioned drive gear 8 (see FIG. 1 or 3) to which in turn is connected the drive motor 9.

The cutting clearance between the shear bushings 73 and the cutters 74 on the cutter rim 75 is made adjustable by an axial fine adjustment of the shaft 79. This is accomplished by having a threaded ring 80 attached to the housing 69, the fine thread of the ring 80 cooperating with a matching threaded bearing flange 81 so that rotation of the flange 81 causes the shaft and rotor to be raised or lowered, respectively. Inadvertant resetting of the bearing flange 81 is prevented by means of a lock nut 82. The bearing flange 81 has on its periphery a row of teeth 83 for engagement by a detent pin 84 with spring 85 and release knob 86 (see FIG. 10).

Figure 11:
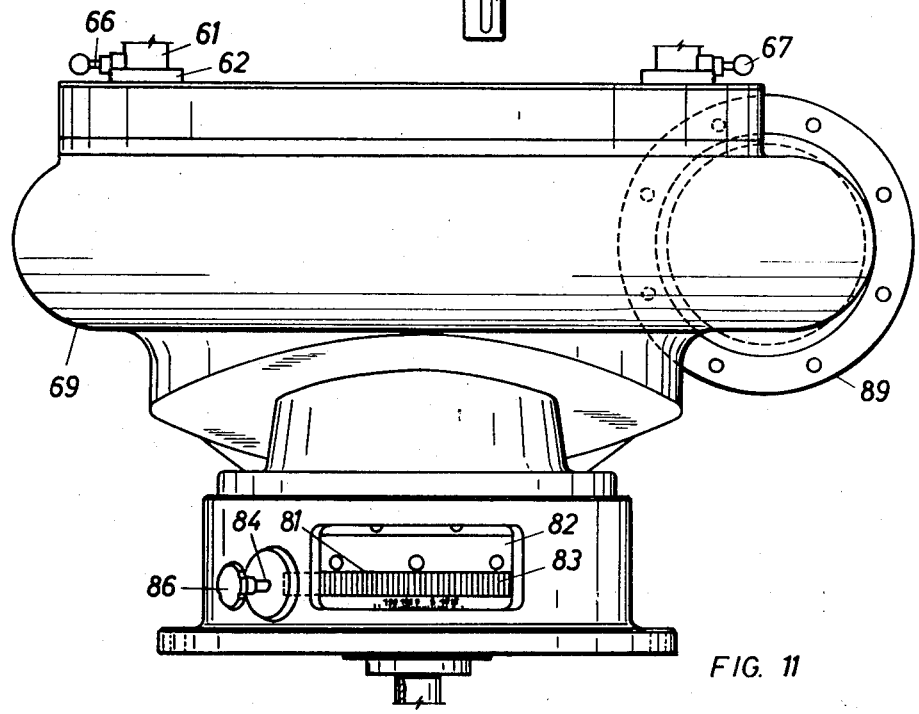
FIG. 11 shows the cutting unit of FIG. 10 in side elevation.
Figure 12:
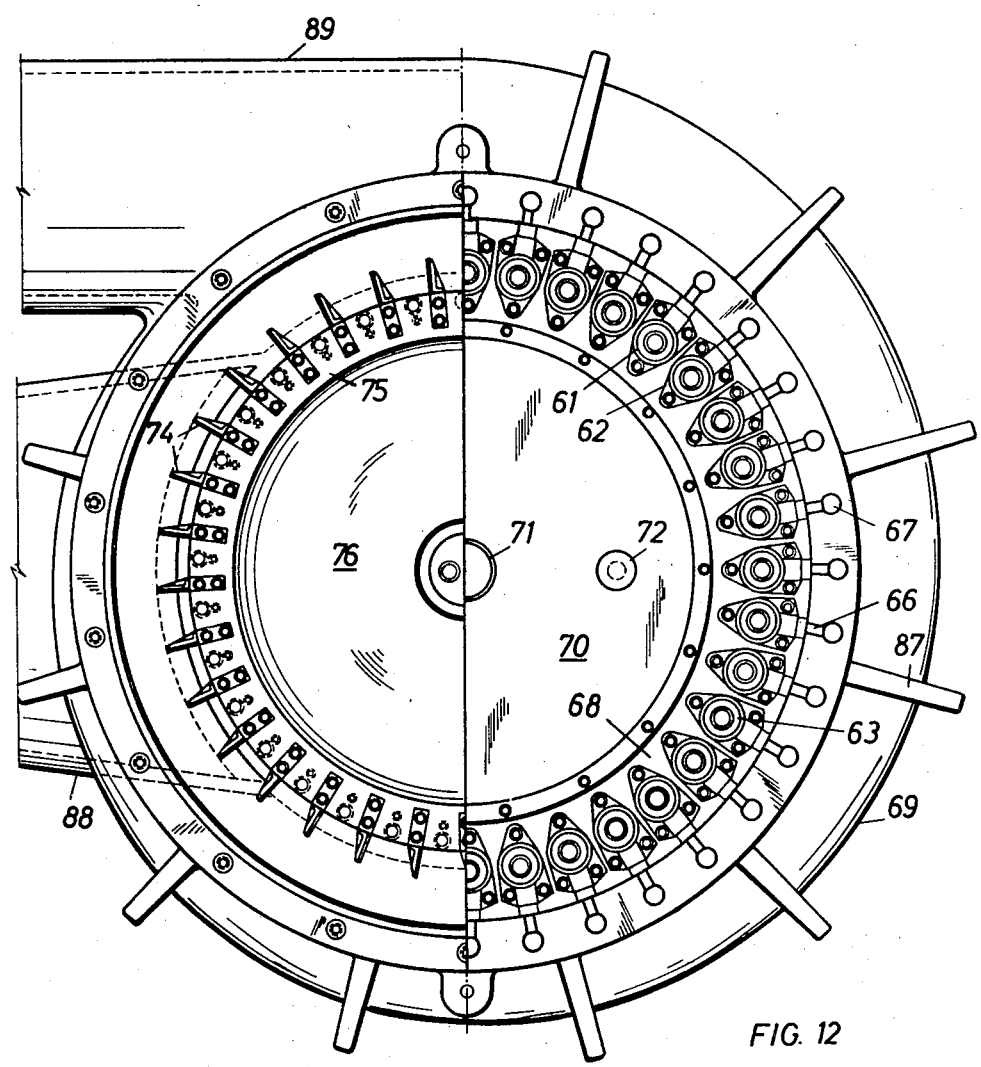
FIG. 12 shows, in plan view, the cutting unit of FIGS. 10 and 11, the left half of the figure showing portions of the unit removed.

As is illustrated in the FIGS. 10, 11 and 12, the housing 69 of the cutting unit is provided with cooling ribs 87 on its outside and with two lateral openings, one being arranged in radial direction, the other one in tangential direction.

Figure 13:
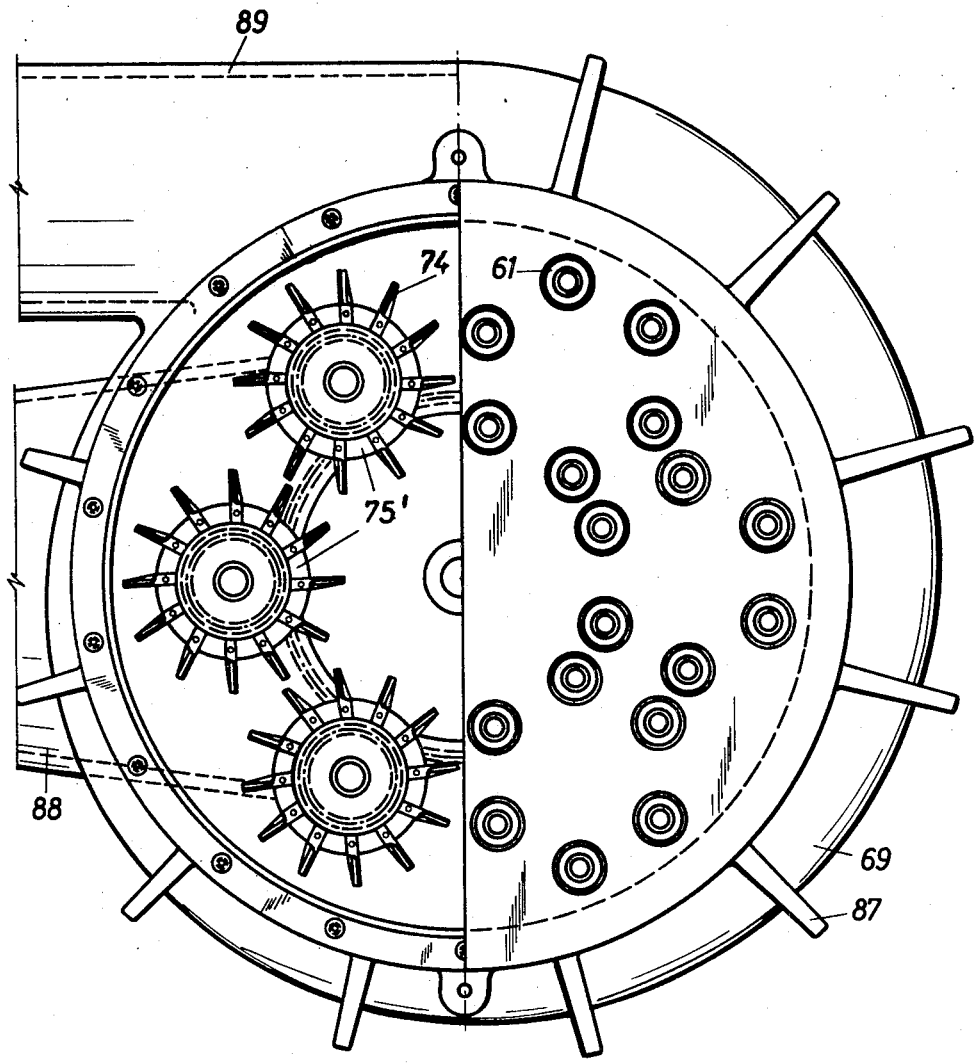
FIG. 13 shows, in a plan view similar to that of FIG. 12, a modified version of the casting unit.

In contrast to the cutting unit 5 shown in FIG. 12, where a large concentric rim 75 carries all the cutters 74, a modified version of a cutting unit 5 is shown in FIG. 13 where several smaller cutter rims 75' are arranged in a circle around the housing axis. Each of these cutter rims 75' cooperates with a likewise smaller group of shear bushings 61. The major advantage of such an arrangement is a reduction in rotary inertia and in stress from centrifugal forces on the rotating parts. The cutters 74 of this version are again axially adjustable in a manner comparable to the adjustment shown in FIGS. 10 and 11.

As can be seen from the preferred embodiments described above in connection with the FIGS. 1–13, the device suggested by the invention is of relatively simple structure, emphasis being placed upon operational reliability and a minimum of wear on all parts. However, the outstanding advantage of the device of the invention resides in its capability of producing granules of highly uniform size, this uniformity being a decisive factor in the quality of the plastic end products produced from the granulated raw material.

It should be understood that numerous modifications can be made on the various units of the preferred embodiment described hereinabove, without thereby departing from the intended scope of the invention as defined in the appended claims.

We claim:

1. A device for the processing of solidifiable materials and compounds such as synthetic plastics and the like from a melt to solid granules of uniform size comprising in combination:
   a melt vessel to hold the solidifiable material in its liquid state;
   a casting unit arranged below the melt vessel and communicating therewith for downward discharge of the liquid material;
   in the casting unit, means to distribute the liquid material issuing from the melt vessel by creating a plurality of independently flowing material strands, and valve means to individually stop and start the flow of the material strands;
   a discharge unit arranged below the casting unit and provided with a plurality of injectors, each injector being aligned to receive one of the liquid material strands created in the casting unit and discharging downwardly therefrom, the discharge unit further including means to solidify and stretch the moving material strands, while guiding them through the injectors;
   conduit means connected to the strand-exit side of the discharge unit to guide the moving material strands issuing through the injectors; and
   a cutting unit to receive the moving solidified material strands from the conduit means and to continuously chop them into granules of uniform size.

2. The device as defined in claim 1, the casting unit communicating with the melt vessel through a main discharge passage, the device further including:
   a main valve to start and stop the discharge of liquid material into the casting unit.

3. The device as defined in claim 1, the casting unit further including:
   a plurality of separate discharge ducts, one for each of the independently flowing material strands, the valve means of the casting unit being in the form of a separate shutoff valve in each discharge duct; and
   means to operate the valve means in the discharge ducts both individually and in unison.

4. The device as defined in claim 3, the casting unit communicating with the melt vessel through a central discharge passage in the axis of the casting unit, the casting unit further including:
   a distributor cone forming the distributing means, the cone being at the lower end of the central discharge passage so as to spread the liquid material issuing from the passage into a downwardly and radially outwardly directed flow;
   the discharge ducts being radially connected to the periphery of the distributor cone to receive separate strands of liquid material from the cone and to guide them axially downwardly.

5. The device as defined in claim 4, the distributor cone being in the form of a double cone completely enclosing the flow of liquid material, the casting unit further comprising:
   wall panels surrounding the distributor cone and the discharge ducts, thereby forming an enclosure in the form of a heating jacket with supply connections for a heating medium, whereby the liquid material moving through the casting unit can be maintained at a desired low viscosity.

6. A device as defined in claim 3, the melt vessel and the casting unit being structurally combined to form an integral unit, the casting unit thereby forming at least a portion of the bottom of the melt vessel; and
   the discharge ducts in the casting unit originating in separate openings in that portion of the casting unit which is part of the bottom of the melt vessel.

7. A device as defined in claim 6, the melt vessel and the casting unit having a common longitudinal axis; the bottom of the melt vessel being generally circular in outline; and
   the openings of the discharge ducts in the bottom of the melt vessel lying on a center circle around the longitudinal axis, this center circle being of such a diameter that it geometrically divides the cross-sectional bottom area of the melt vessel into an outer annular area and an inner circular area, both of approximately equal size.

8. A device as defined in claim 7, the distributing means of the casting unit being in the form of a distributing cone, the cone being formed by centrally raising the circular bottom area located within the center circle of the discharge duct openings;
   the annular bottom area located outside the center circle of the discharge duct openings being similarly raised to incline radially upwardly away from the discharge duct openings.

9. The device as defined in claim 8, the raised outer annular bottom area of the melt vessel forming a reinforced end flange at the bottom of the melt vessel;

the casting unit having a matching flange whereby it is sealingly and detachably mounted to the bottom of the melt vessel;

the distributing cone being a central part of the detachable casting unit, and the discharge ducts traversing the flange of the casting unit; the casting unit further including:

a heating jacket arranged underneath of the distributor cone and casting unit flange with supply connections for a heating medium, whereby the liquid material above the distributor dome and in the discharge ducts can be maintained at a desired low viscosity.

10. The device as defined in claim 8, the opening angle of the distributing cone being not less than approximately 60° and not more than approximately 120°;

the angle of incline of the outer annular bottom area from the plane of the discharge duct openings being not less than 30° and not more than 60°.

11. The device as defined in claim 6, the melt vessel and the casting unit having a common longitudinal axis; the bottom of the melt vessel being generally circular in outline; and the openings of the discharge ducts in the bottom of the melt vessel lying on several concentric center circles around the longitudinal axis, the geometric mean value of the several center circle diameters being such that a circle of its diameter would divide the cross-sectional bottom area of the melt vessel into an outer annular area and an inner circular area, both of approximately equal size.

12. The device as defined in claim 6, the discharge ducts in the bottom of the melt vessel having a diameter of preferably 20 mm., but not less than 15 mm. and not more than 30 mm.

13. The device as defined in claim 12, the discharge ducts in the bottom of the melt vessel tapering narrower away from their inlet openings, the diameter defined above being measured at the narrowest portion of the discharge duct.

14. The device as defined in claim 7, the axes of the discharge ducts being inclined with respect to the longitudinal axis, extending downwardly and radially away from the center of the casting unit.

15. The device as defined in claim 3, the valve-operating means of the casting unit including:

as part of each shutoff valve, a radially extending valve shaft and a valve control lever operably attached to the end of the valve shaft;

a valve control ring rotatably guided on the periphery of the casting unit in a plane parallel to the general plane occupied by the shutoff valves;

means to link the valve control levers to the valve control ring for simultaneous movement therewith between an open valve position and a close valve position, these linking means including means to unlink individual valves from the valve control ring to allow separate movement of the unlinked valves; and means to move the valve control ring between two end positions.

16. The device as defined in claim 15, the linking means including an upstanding portion on each valve control lever and, attached to the valve control ring, a pair of radially extending pins with rollers for each valve control lever to engage the upstanding portion of the lever from two sides, thereby transmitting any ring motion to the lever;

the unlinking means including a pivot connection between the valve control levers and their associated shafts, this pivot connection allowing movement of the upstanding portion of the lever out of the engagement range of the roller pairs on the valve control ring, while maintaining the valve operative connection between the lever and the valve shaft.

17. The device as defined in claim 15, the means to move the valve control ring including:

a double-acting power cylinder tangentially engaging the valve control ring for forcible movement of the ring in two directions; and an auxiliary main control lever likewise engaging the valve control ring to allow manual operation of the valve control means.

18. The device as defined in claim 1, the discharge unit further including:

a water housing defining therein two separate water chambers: a headwater chamber, and a pressure water chamber;

the strand solidifying and stretching means including: a continuous supply of substantially turbulence-free water through the headwater chamber into the injectors of the discharge unit, and a continuous supply of pressurized water through the pressure water chamber into the same injectors;

the injectors being oriented substantially vertically.

19. The device as defined in claim 18, each injector of the discharge unit including:

an injector standpipe mounted in the water housing, the pipe being open on both ends;

an injector casing of larger diameter than the standpipe and mounted concentrically therewith in the water housing so as to form an open annular pressure water duct between the casing and the standpipe; and an injector head sealingly connected to the upper end of the injector casing and including:

a funnel-shaped mouth portion aligned with the upper end of the standpipe for the entry of headwater into the injector; and a downwardly extending tapered collar forming a downwardly and radially inwardly directed turnaround-extension of the annular pressure water duct in the form of an injector gap between the collar periphery and the end portion of the standpipe for the entry of the pressurized water into the injector.

20. The device as defined in claim 19, the headwater chamber being generally bowl shaped and including within a peripheral portion of its water space all the injector heads, the upper end of their mouth portions thereby determining the uppermost water level inside the headwater chamber, while the annular pressure water ducts of the injectors are sealed off from the headwater chamber;

the pressure water chamber being generally ring shaped and located beneath the peripheral portion of the headwater chamber so as to communicate with all the pressure water ducts;

the injector standpipes extending downwardly through the water housing and communicating individually with the conduit means of the device.

21. The device as claimed in claim 19, each injector head further including:

a bayonet-type quick release connection forming the sealing connection with the injector casing.

22. The device as defined in claim 20, the headwater chamber including a screen to filter the headwater passing therethrough and to simultaneously reduce its turbulence;

the pressure water chamber including a similar screen.

23. The device as defined in claim 1, the discharge unit further including:

lifting means to lower and raise the discharge unit with respect to the casting unit positioned above it; and translating means to laterally move the discharge unit into and out of alignment between the material strands discharging from the casting unit and the injector axes of the discharge unit.

24. The device as defined in claim 1, the conduit means being sealingly connected to both the discharge unit and the cutting unit, these conduit means including:

a separate strand conduit for each injector of the discharge unit; and quick-release connecting means at both ends of each strand conduit for individual connection to the discharge unit and the cutting unit.

25. The device as defined in claim 24, the strand conduits being flexible hoses; the quick-release connecting means including for each strand conduit:

a connecting sleeve permanently attached to each end of the hoses to form a continuous bore therewith, each sleeve including a tapered seat portion and a retaining groove on its outer surface;

a connecting socket mounted at the strand exit side of the discharge unit in alignment with an injector exit, the connecting socket having an enlarged bore forming a matching tapered seat with the connecting sleeve; and a spring-loaded retaining pin and knob in the connecting socket, the pin releasably engaging the retaining groove of the connecting sleeve;

a similar connecting socket and spring-loaded retaining pin mounted at the strand-receiving side of the cutting unit.

26. The device as defined in claim 1, the cutting unit including:

a stationary main housing having at least one outlet passage for water and material granules;

a collar at the strand-receiving side of the cutting unit, with a separate passage through the collar for each solidified material strand;

cutting means continuously moving within the main housing transversely to the moving material strands to chop them into granules of uniform size, and drive means for transmitting motion to the cutting means.

27. The device as defined in claim 26, the collar of the cutting unit including:

a plurality of shear bushings on the inside of the collar, one for each strand passage, the shear bushings having a shear face aligned along a common cutting path, the path in which the cutting means move;

connecting means attached to the outside of the collar for the attachment of the conduit means through which the material strands are received; and means to adjust the cutting clearance between the shear faces and the moving cutting means.

28. The device as defined in claim 27, the collar of the cutting unit having a generally circular outline, the strand passages and shear bushings being located in a circle, with their shear faces in a common plane perpendicular to the main axis of the housing;

the cutting unit further including:

a drive shaft rotatably supported by bearings in the main axis of the housing;

a rotor fixedly mounted on the drive shaft for rotation therewith; and a cutting rim on the rotor facing toward the shear bushings, the cutting means being a plurality of cutting edges on the cutting rim.

29. The device as defined in claim 28, the cutting rim being detachably mounted on the rotor, and including a plurality of interchangeable cutters attached to the cutting rim, these cutters representing the cutting means;

the collar of the cutting unit including a central access lid with an air vent for access to the cutting rim.

30. The device as defined in claim 28, the main housing having a generally circular outline and including two outlet passages, one of them being oriented tangentially with respect to the housing periphery, the other one being oriented radially thereto; the housing being surface-treated against abrasion.

31. The device as defined in claim 28, the adjusting means for the cutting clearance including:

an inner ball bearing on the drive shaft allowing for axial mobility of the shaft toward and away from the shear bushings;

an outer ball bearing on the drive shaft axially restrained relative to the shaft;

a bearing flange holding the outer bearing in an axially restraining manner, the bearing flange being axially adjustable and blockable relative to the main housing while providing a bearing support for the outer end of the drive shaft.

32. The device as defined in claim 31, the bearing flange being threaded for axial adjustment and including a peripheral row of teeth;

the main housing further including a stationary threaded portion matching the thread of the bearing flange, and a radially oriented, spring-loaded detent pin and knob engaging the teeth of the bearing flange.

33. The device as defined in claim 32, the adjusting means further including a threaded locking engaging the stationary threaded portion of the housing and facing the bearing flange.

34. The device as defined in claim 27, the strand passages and shear bushings in the collar of the cutting unit being divided into several groups, each located in a separate cutting circle, with the shear faces in each group in a common plane;

the cutting unit further including:

a rotor for each separate group of shear bushings, including a drive shaft for each rotor; and a cutting rim on each rotor facing toward the respective group of shear bushings, the cutting means being a plurality of cutting edges on each cutting rim;

the drive means transmitting rotary motion simultaneously to all rotors.

35. A device for the processing of solidifiable materials and compounds such as synthetic plastics and the like from a melt to solid granules of uniform size comprising in combination:

a plurality of spaced melt vessels to hold the solidifiable material in its liquid state, the vessels being arranged in a stationary position at a common level above a floor or support platform;

a casting unit fixedly mounted below each melt vessel and communicating therewith for downward discharge of the liquid material;

in each casting unit, means to distribute the liquid material issuing from the associated melt vessel by creating a given, identical number of independently flowing material strands, and valve means to stop and start the discharge of liquid material through any one of the casting units;

a common discharge unit for selective connection to the discharge side of any one of the casting units, the discharge unit including a plurality of injectors, each injector being aligned to receive one of the liquid material strands created in the particular casting unit and discharging downwardly therefrom, the discharge unit further including means to solidify and stretch the moving material strands, while guiding them through the injectors;

a plurality of flexible hoses connected to the strand-exit side of the discharge unit, each hose communicating with an injector to receive and guide the moving material strands issuing therefrom;

a cutting unit to receive the moving solidified material strands from the flexible hoses and to continuously chop them into granules of uniform size; and a movable dolley independently supporting the weight of the discharge unit, while itself being supported by the floor or support platform; the dolley including: a dolley structure; lifting means to lower and raise the discharge unit with respect to the dolley structure, and translating means to laterally move the discharge unit into and out of alignment between the material strands discharging from any one of the casting units and the injector axes of the discharge unit.

36. The device as defined in claim 35, the lifting means of the movable dolley including:

a plurality of vertically aligned guide columns, each column including a guide barrel and a fitting guide rod; the guide rods and guide barrels being rigidly attached to the discharge unit and the dolley structure, respectively; and a lifting cylinder supported by the dolley structure in a vertical position, the upper end of the piston rod engaging the discharge unit so as to support the weight of the unit.

37. The device as defined in claim 35, the translating means of the movable dolley including:

a horizontal rail structure mounted to the floor or support structure;

a set of support wheels mounted to the dolley structure and riding on the rail structure.